July 25, 1950

W. F. FOX 2,516,197

METHOD OF PROTECTING PREFORMED
FURNITURE PANEL GROOVES
Filed Oct. 5, 1948

INVENTOR.
WILLIAM F. FOX.
BY
Alden L. Redfield
ATTY.

Patented July 25, 1950

2,516,197

UNITED STATES PATENT OFFICE 2,516,197

METHOD OF PROTECTING PREFORMED FURNITURE PANEL GROOVES

William Francis Fox, Cincinnati, Ohio, assignor to Avco Manufacturing Corporation, Cincinnati, Ohio, a corporation of Delaware Application October 5, 1948, Serial No. 52,897

1 Claim. (Cl. 41—39)

The present invention relates to a novel method of making an article of manufacture, and more specifically to a novel method of preparing a furniture panel for the insertion of a decorative molding strip into a complementary groove in the panel.

In accordance with prior art practices, wood panels on which molding is provided are cut to size and finished in such a way that the rough panel has integral molding, beads or strips projecting from the overall flat surface of the panel. Then the rough panel is smooth sanded, filled, sealed, stained, and lacquered (being rubbed and sanded between coats). The molding may comprise a simple decorative pattern, perhaps a quadrangle, or it may represent a complex decorative theme. In either case time-consuming, expensive labor and extreme precaution must be devoted to delicate sanding, filling, sealing, staining, rubbing, lacquering and finishing operations adjacent to the molding, and to leveling down the overall flat surface below the molding. The number of these operations is so large that the time and expense factor involved in the precise and careful treatment close to the molding is very great. This factor is aggravated when the molding is of a color or finish different from the remainder of the panel.

The primary object of the invention is to provide a novel method of making a panel with molding which comprises the successive steps of routing a groove into the panel, inserting a dummy filler into the groove, finishing the panel, then removing the dummy filler, and finally securing in the groove a separately finished molding strip. In the practice of this method the finishing operations on the panel are performed with the dummy in place, and they require no precautions other than those required in treating the overall surface of the panel.

For a better understanding of the present invention, together with other and further objects, advantages and capabilities thereof, reference is made to the following description of a preferred illustrative embodiment thereof, to the appended claim, and to the accompanying drawings in which:

Figure 1:
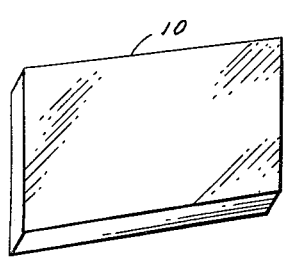
Fig. 1 is a perspective view of a panel to be processed in accordance with the present invention.
Figure 6:
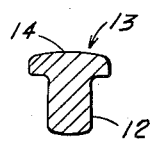
Fig. 6 is a cross-sectional view of the separate molding strip taken on line 6—6 of Fig. 7.
Figure 7:
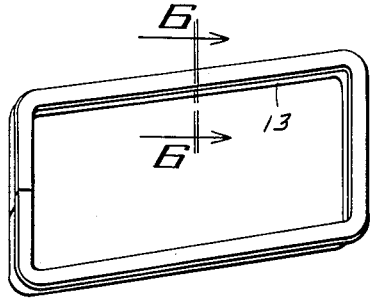
Fig. 7 is a perspective view of the molding strip.

Referring now to Fig. 1, there is shown a hardwood panel 10, cut to the desired size and preferably first rough sanded before performance of other operations. A router or other conventional tool is employed to cut out a groove or depression 11 (Figs. 2, 3) complementary to the web 12 of a T-shaped separate molding insert or strip 13 (Figs. 6, 7).

Figure 2:
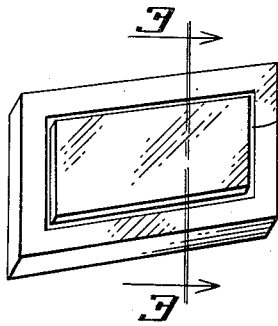
Fig. 2 is a perspective view of the panel after the groove has been cut out by the router.
Figure 3:
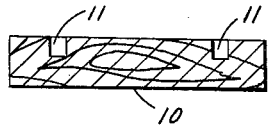
Fig. 3 is a cross-sectional view of the panel as taken on line 3—3 of Fig. 2, looking in the direction of the arrows.

The molding 13 comprises a web section 12 and an integral flange section 14 and is preferably of extruded plastic composition. The molding is preferably made from any of the reasonably hard plastics and can be formed either cold or with heat. Its geometrical configuration (Fig. 7) conforms to that of the groove (Fig. 2).

Figure 4:
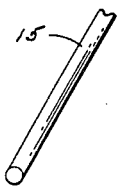
Fig. 4 is a perspective view of the cord or string dummy which is inserted in the panel groove before the finishing operations are performed.
Figure 5:
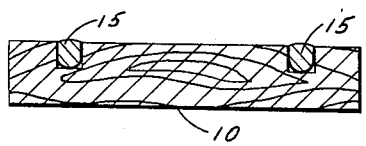
Fig. 5 is a cross-sectional view showing the dummy in place in the panel groove.

After the groove 11 is routed, a dummy, comprising cord or string 15 (Figs. 4, 5), is inserted into the groove, in order to prevent shaving and finishing material from filling the groove.

Next the desired finishing operations are performed on panel 10; fine sanding, filling, sealing, staining and lacquering, with the required sandings and rubbings between coats. It is to be particularly noted that the standard of care and precision work during finishing is established by the overall flat surface of the panel 10, the dummy cord 15 not imposing the heretofore higher standard required for the finishing operations.

Figure 8:
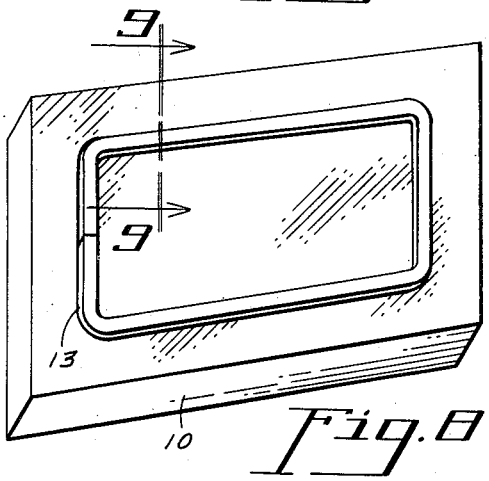
Fig. 8 is a perspective view of the panel with molding in place.
Figure 9:
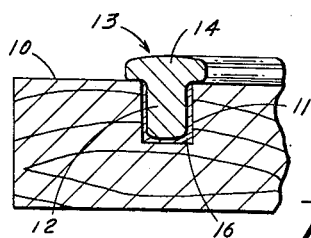
Fig. 9 is a cross-sectional view of the complete product, taken on line 9—9 of Fig. 8.

After the finishing operations have been completed the dummy cord 15 is withdrawn from the opening and the separate molding strip 13 is pressed into place (Fig. 8) on the panel, the web 12 conforming to the groove 11, and the flange 14 tightly overlapping the groove. Cement 16 is employed where necessary (Fig. 9), the number of spots to which cement is applied being determined by the length and shape of the strip 13.

Figure 10:
Fig. 10 is a sectional view of a prior-art panel with integral molding.

In Fig. 10 there is shown a sectional view of a conventional panel provided with molding. It will be seen that the Fig. 9 panel, in accordance with the invention, can be made to provide the same decorative effect as the Fig. 10 panel, or any desired contrasting-color, blending-color, same-color, or harmonious-color effects, without regard to the prior-art finishing problems heretofore presented by the discontinuities between the prevailing flat surface of the panel and an integral molding strip. The Fig. 9 construction is therefore adapted to design flexibility and relatively low cost.

While there has been shown what is at present regarded as the preferred embodiment of the invention, it will be understood that various changes and modifications may be made therein without departing from the invention as defined by the appended claim.

Having fully described and disclosed the invention, I claim:

The method of protecting a pre-formed furniture panel groove prior to insertion of a decorative molding strip, which comprises the steps of inserting a dummy cord into said pre-formed furniture panel groove before the panel is smoothed, smoothing and finish coating said panel, and removing said dummy cord from said pre-formed groove after the last finish coating has been applied to said panel, thereby protecting and maintaining said pre-formed grooving in condition to receive said decorative strip.

WILLIAM FRANCIS FOX.

REFERENCES CITED

The following references are of record in the file of this patent:

UNITED STATES PATENTS

| Number | Name | Date |
|---|---|---|
| 127,353 | Knipfer | May 28, 1872 |
| 230,776 | Hilpert | Aug. 3, 1880 |
| 307,483 | McClain | Nov. 4, 1884 |
| 486,590 | Rausch | Nov. 22, 1892 |
| 1,416,212 | Kaufmann | May 16, 1922 |
| 1,804,024 | Nicolas et al. | May 5, 1931 |
| 2,131,900 | Morgan | Oct. 4, 1938 |
| 2,339,865 | Larmour | Jan. 25, 1944 |